United States Patent [19]

Johnson

[11] Patent Number: 4,551,112
[45] Date of Patent: Nov. 5, 1985

[54] PROTECTIVE COVER FOR WATERFOWL CALLERS

[76] Inventor: William E. Johnson, 3107 State Rd., #227 N, Richmond, Ind. 47374

[21] Appl. No.: 564,287

[22] Filed: Dec. 22, 1983

[51] Int. Cl.[4] .................................. A63H 5/00
[52] U.S. Cl. ............................................ 446/207
[58] Field of Search ............ 446/202, 203, 204, 205, 446/206, 207, 208, 209; 84/380 C, 383 R

[56] References Cited

U.S. PATENT DOCUMENTS

| | | | |
|---|---|---|---|
| 1,682,341 | 8/1928 | Keplinger | 446/204 |
| 1,766,095 | 6/1930 | Beall | 446/204 |
| 2,729,025 | 1/1956 | Jones | 446/208 |
| 4,048,750 | 9/1977 | Wolfe | 446/193 |

Primary Examiner—Mickey Yu
Attorney, Agent, or Firm—Glenn K. Robbins

[57] ABSTRACT

A protective cover for waterfowl callers such as duck and goose callers. A cover is of rubber or the like and is in the form of a tube which is fitted in expanded condition over an interfitting mouthpiece and barrel of the caller in close frictional engagement to prevent the mouthpiece and barrel from being accidentally separated. The ends of the cover may be rolled back over an interfitting junction of the mouthpiece and barrel to accommodate the caller reed adjustment as desired. The mouthpiece end of the cover has a protective cap which can be pulled over an open end of the mouthpiece to protect it when not in use or folded back over the mouthpiece when in use. The barrel end of the cover may extend beyond the barrel end of the cover and closed to protect this end when not in use or rolled back over the barrel in use.

9 Claims, 12 Drawing Figures

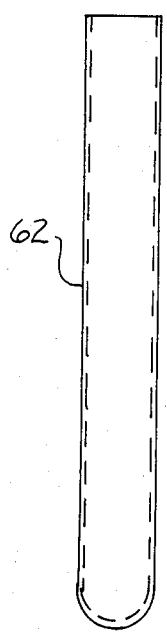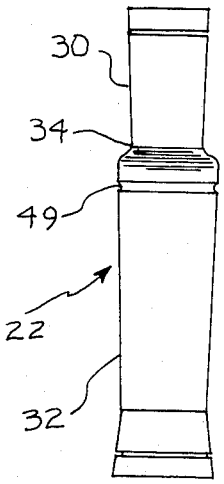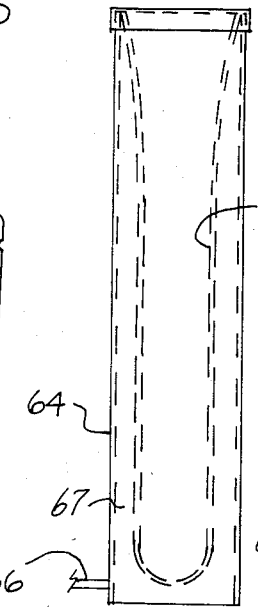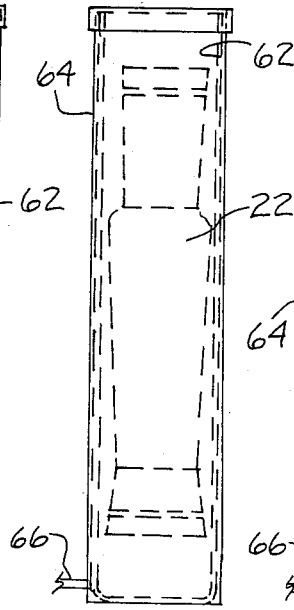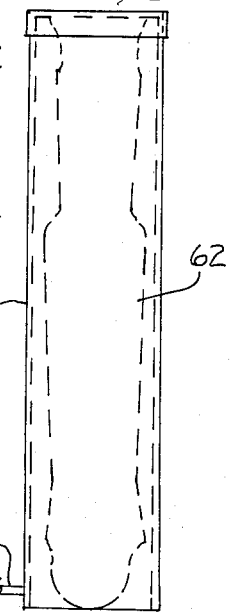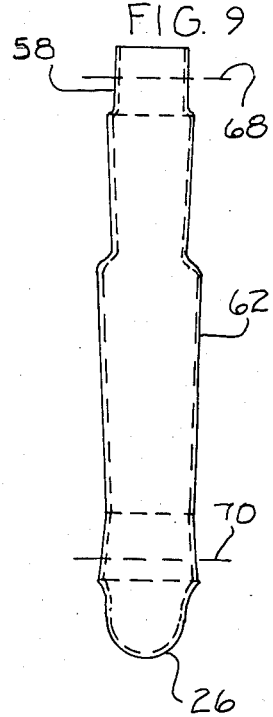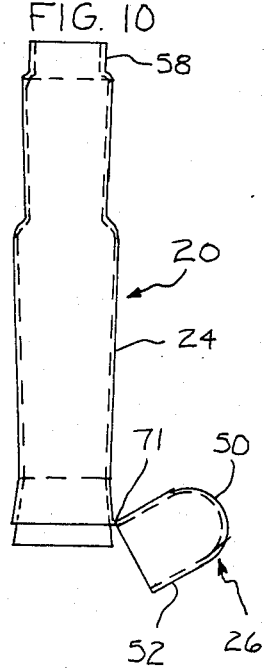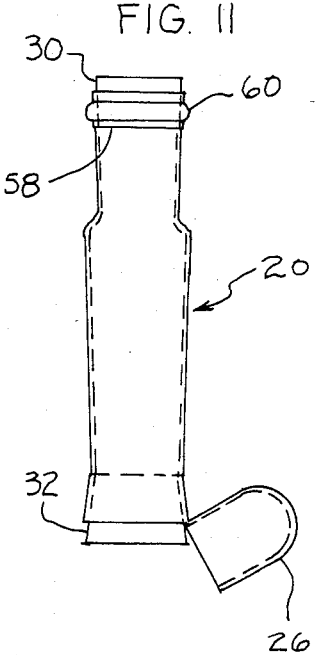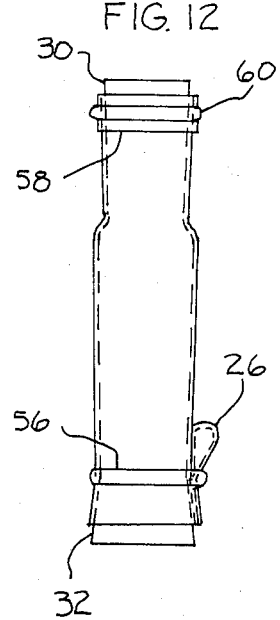

4,551,112

PROTECTIVE COVER FOR WATERFOWL CALLERS

BACKGROUND OF THE INVENTION

Waterfowl callers such as duck or goose callers have long been used to simulate waterfowl calls to attract and call in such waterfowl to the area of the caller. Such callers conventionally are constructed of a barrel portion supporting an internal adjustable reed and a mouthpiece. The mouthpiece is interfitted with the barrel and may be removed for the adjustment of the reed to effect different tones or pitch of the call as desired and well known in the art.

Such callers are subject to accidental separation of the mouthpiece and barrel portions such as when being supported by a lanyard around the neck of the user or when subjected to sudden jostling or other accidental forces. Further the open ends of the mouthpiece and barrel are subject to being clogged or filled by unwanted foreign objects which can interfere with the proper operation of the caller and can cause damage.

A further problem in such callers has been the shiny and cold surface of the caller which is conventionally made of wood or plastic or the like. The shiny surface can catch the eye of wary waterfowl while the cold surface may cause discomfort in handling the caller.

SUMMARY OF THE INVENTION

By means of this invention there has been provided a protective cover for waterfowl callers which can be simply fitted over the caller for efficient use in the field.

The cover is constructed of an elastic tubular rubber or the like material which is fitted in an expanded position snugly over both the mouthpiece portion and barrel portion of the caller to bridge the interfit of the two portions to hold them together. The tight elastic fit of the cover prevents air leakage and resists any tendency of the mouthpiece to separate from the barrel portion in the rough usage encountered in the field.

The cover is provided with a protective cap at the mouthpiece end of the caller which can be snugly fitted over the open mouthpiece end to protect it when not in use. In operation of the caller the cap is folded back over the mouthpiece and may be retained by a ring member such as a rubber band or sleeve ring or the like to hold the cap against the side of the mouthpiece.

The opposite end of the cover is dimensioned to extend somewhat beyond the open barrel end of the caller. The extension of the cover may be crimped by a further ring member such as a rubber band or sleeve ring or the like to close the barrel end when not being used. When the caller is desired to be operated the open barrel end of the cover is simply rolled back along itself over the barrel to open up the barrel end.

When it is desired to adjust the reed in the mouthpiece the barrel end of the cover amy simply be rolled back a further distance along the barrel and over the mouthpiece to expose the interfitting junction between the barrel and the mouthpiece to permit removal of the mouthpiece and adjustment of the reed as in conventional practice.

The cover is constructed of rubber or similar synthetic elastomers to provide the desired degree of elasticity to provide a tight fit over the two pieces of the waterfowl caller. The exterior of the cover is provided with a roughened or irregular surface of a dark color which effects a dual function of non-reflectivity and comfort in handling. The tight fit of the cover not only prevents dislodgement of the mouthpiece and the barrel but also provides a seal around the interfit or junction to prevent air leakage and consequent impairment of the desired call emitting from the caller.

The cover may be simply fitted upon the cover by expanding it through one means or another and inserting the caller and then releasing the expansion force to constrict the cover around the caller in fitted relation. One such means may be by vacuum a negative force or vacuum in a vacuum chamber or the like applied on the exterior surface of the cover to cause the aforementioned expansion after which the caller is inserted within the cover followed by release of the vacuum differential force.

The protective cover and grip is inexpensive and can be simply employed in the field. It provides an efficient and effective means for protecting the caller while permitting adjustment as desired.

The above features are objects of this invention. Further objects will appear in the detailed description which follows and will be further apparent to those skilled in the art.

For the purpose of illustration of this invention preferred embodiments thereof are shown in the accompanying drawing. It is to be understood that the drawing is for purpose of description only and that the invention is not limited thereto.

IN THE DRAWING

FIG. 4 is a view in side elevation of a rubber sleeve used in the invention;

FIG. 5 is a view of a typical waterfowl caller;

FIG. 6 is a view in elevation showing a first stage in the mounting of the cover on the waterfowl caller before vacuum has been applied;

FIG. 7 if a view of a second stage after vacuum has been applied;

FIG. 8 is a view of a third stage after the vacuum has been released;

FIG. 9 is a view in side elevation of the protective cover after it has been removed from the vacuum device;

FIG. 10 is a view similar to FIG. 9 showing the trimming of the cover;

FIG. 11 is a view similar to FIG. 10 showing the end of the cover rolled back over the muzzle of the waterfowl caller; and FIG. 12 is a view similar to FIG. 11 but showing the cap folded back along the mouthpiece and the caller ready for use.

DESCRIPTION OF THE INVENTION

Figure 1:
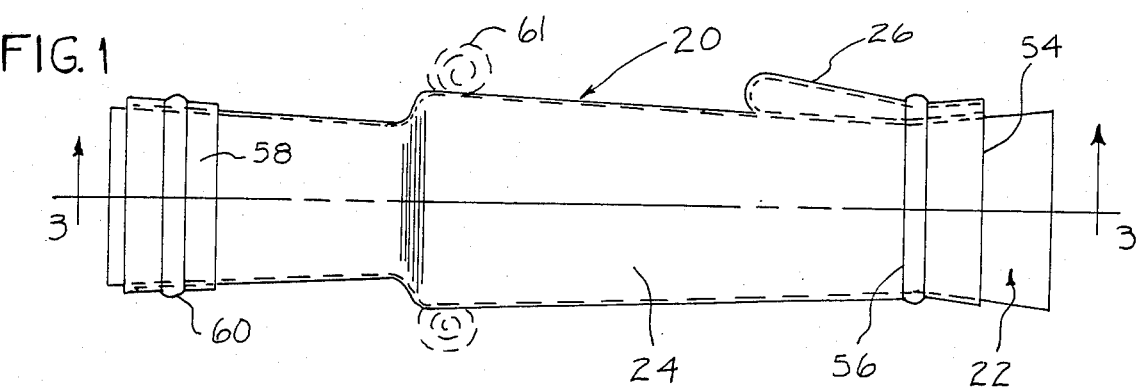
FIG. 1 is a view in side elevation of the waterfowl caller with the cover in the ready to use position.
Figure 2:
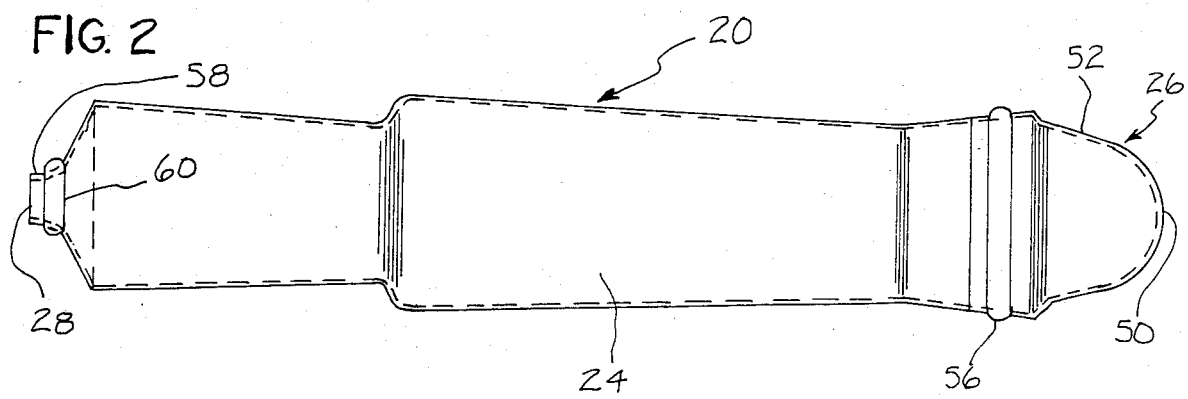
FIG. 2 is a view in side elevation similar to FIG. 1 but showing the cover adjusted to the protective position.

The protective cover of this invention is generally indicated by the reference numeral 20 in FIGS. 1 and 2 where it is shown fitted over a waterfowl caller 22. The waterfowl caller is of conventional construction and forms no part of this invention, per se.

The cover is constructed of a tubular elastic rubber like body 24 having a protective cap 26 at one end and an open opposite end 28. The cover is constructed of rubber or rubber like synthetic elastomers of conventional nature as are well known in the art to provide the desired elasticity and stretch. The exterior surface of the cover may desirably be provided with a roughened or irregular pattern and may have a dark color of black or brown to minimize reflectivity. The roughened or irregular surface characteristic further provides ease in handling by the use and this feature combined with the rubber like nature of the body 24 provides a non-slip surface for connection of a lanyard anywhere around the body.

Figure 3:
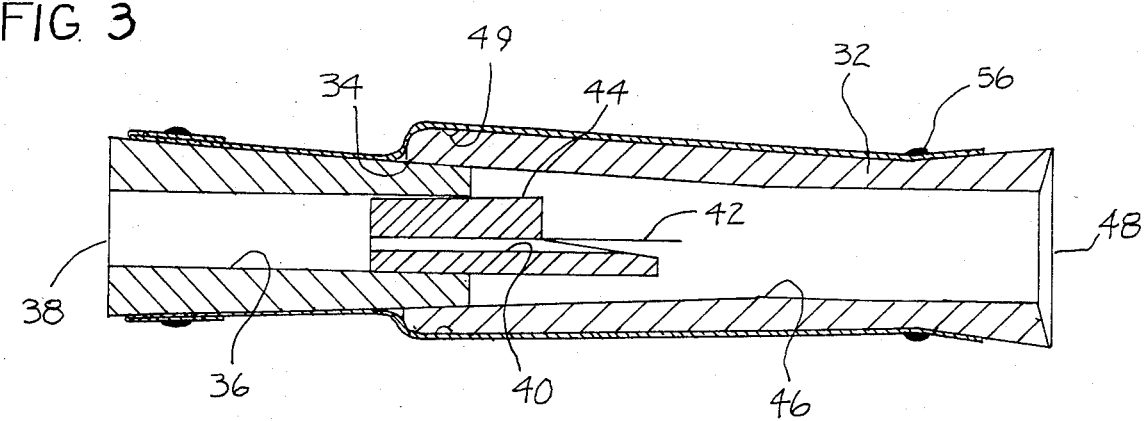
FIG. 3 is a view in longitudinal section taken on the line 3—3 of FIG. 1.

The waterfowl caller 22 may be either a duck caller or goose caller as they are similar in construction. Such callers as best shown in FIGS. 1, 2 and 3 conventionally are of two piece construction comprising as the two major pieces a barrel portion 30 and a mouthpiece portion 32 interfitted through a tapered fit with one another in mating relation at a junction 34. The barrel portion has internal bore 36 having a muzzle or outlet end 38. A reed support and sound chamber 40 is supported within the bore and provides a base for an adjustable reed 42. The reed may be adjusted longitudinally with respect to the sound chamber to vary the nature of the call emitted. A wedge 44 fits within the bore to hold the reed in anchored position.

The mouthpiece 32 is provided with an enlarged bore 46 having a tapered end portion which receives a correspondingly tapered exterior portion of the barrel to provide the fitted mating junction 34. The opposite free end of the bore is open at the mouthpiece end 48 as shown in FIG. 3. A groove 49 receives the usual lanyard.

The above described description of the conventional structure of a watefowl caller provides a background of the function of the protective cover which closely and snugly encloses the caller to provide the several functions of protection.

The cover structure delineated in further detail provides the cap 26, which as shown may be of a dome shaped configuration, with an end 50 and side 52. The cap is formed by a circumferential slit or cut around a major portion of the circumference of the cover to leave only a hinge portion which for purpose of example may be only about 30° of the circumference of the cover. Thus, the main body of the cover terminates at the end portion 54 as shown in FIG. 1 to leave a small portion of the caller mouthpiece exposed when the cover is folded back in the ready to use position as shown in this figure.

The cover when folded back may be retained alongside the mouthpiece by a ring member 56, such as a rubber band or sleeve ring. When the cover is not in use the cap member 26 is pulled over the mouthpiece in the protective relationship shown in FIG. 2. This is accomplished by simply pulling the side 52 of the cap over the end of the mouthpiece. The rubber band ring member 56 may be moved over the side of the cap to aid in the cap retention as desired.

The opposite end of the cover has an extended end portion 58 as best shown in FIGS. 1, 2 and 3. It extends a short distance beyond the free muzzle end of the barrel. It is closed in the not in use position by a ring member 60 such as a rubber band or the like. In use the end portion of the cover is rolled back upon itself over the muzzle end of the barrel. When it is desired to remove the barrel portion from the mouthpiece for reed adjustment the extended end portion 58 of the cover may be rolled back further over the junction 34 of the barrel and the mouthpiece upon the left end of the mouthpiece in order that the barrel may be removed for the necessary adjustment as shown in dotted line in FIG. 1 at 61.

The protective cover is simply and efficiently fitted over the waterfowl caller by expanding the cover and placing the caller within the cover and releasing the force causing the expansion to permit the cover to constrict to closely and snugly encase the caller. It will be understood that the internal circumference of the cover must be somewhat less than the smallest circumference of the circumference to firmly encase all parts.

The expansion of the cover is readily effected by vacuum such as for purpose of example as shown in U.S. Pat. No. 4,016,640. A rubber cover blank 62 as shown in FIG. 4 is inserted in a tubular vacuum chamber 64 with the dome-shaped cap 26 at the bottom of the chamber. The chamber is open at the top and has an inlet 66 leading to a conventional source of vacuum or negative pressure such as a vacuum pump (not shown). The extended open end 58 of the cover blank is rolled over the top rim of the chamber in the position shown in FIG. 6 to leave a sealed space 67 communicating with the vacuum inlet 66.

In a second stage as shown in FIG. 7 the vacuum pump or other vacuum source is operated to cause the cover blank to expand against the inner side of the vacuum chamber due to negative pressure on the external side of the elastic cover. The caller is then inserted within the enlarged cover as shown.

In a third stage as shown in FIG. 8 the vacuum is released. The cover 20 then relaxes toward its natural shape to constrict tightly around the encased caller.

In the fourth stage as shown in FIG. 9 the extended end 58 of the cover is rolled back from the rim of the vacuum chamber and the cover and caller are removed. The extended end is cut along line 68 to leave the extended barrel end portion 58. The removed material may be further cut to provide rubber bands. The opposite cap member end is cut on line 70 around a major portion of the circumference such as about 330° to leave only a hinge or fold portion connecting the cap member 26 to the cover body 24. The hinge is shown at 71.

The finally formed protective cover is shown in FIG. 10.

FIG. 11 shows the extended end 58 of the cover rolled back over the barrel end of the caller. The ring member 60 employed in closing the extended end over the barrel is shown retained over the cover.

FIG. 12 shows the cap member 26 folded back along the side of the mouthpiece adjacent the end. The rubber band retaining ring member 56 is fitted around the cap member to hold it in place.

USE

The cover of this invention is shown ready for use with a waterfowl caller in the field in the cover position shown in FIGS. 1 and 12. In this position the cover closely encases the barrel 30 and mouthpiece 32 portions and the interfitting junction to hold the portions together and provide an airtight seal to prevent air leakage into the caller. Such leakage can tend to cause distortion of the call.

Several of such callers may be connected to a lanyard worn around the neck of the user. The protective rubber like cover allows the lanyard to be snugly attached in any location and not just the lanyard groove and softens accidental jarring of the callers and further provides comfortable and ready handling for the user. The irregular or roughened dark surface, such as a black or brown color, further serves to absorb light and minimize reflectivity which would serve to alarm any waterfowl being caller by the user.

Should the caller wish to adjust the reed 42 supported within the barrel the rubber band ring member 60 is moved out of the way and the rolled back extended end portion 58 is simply rolled back past the junction 34 and over the mouthpiece. The reed may then be adjusted in the usual manner by removing the retaining wedge 44 and adjusting the reed as desired. The reverse procedure to that aforedescribed is employed to fit the mouthpiece and barrel back together and roll the extended end portion of the cover to the in use position of FIGS. 1 and 12.

After use in the field the protective cover is simply positioned to close the open ends of the mouthpiece and the barrel to the position shown in FIG. 2. In this position both of the open ends are closed to prevent clogging by any foreign objects such as debris, wasp nests or the like. To close the mouthpiece end the rubber band retaining member is moved out of engagement with the cap member 26. The cap member is then fitted over the open end 48 of the mouthpiece with the side 52 expanded over the side of the end portion of the mouthpiece. The retaining rubber band ring may be fitted over the side of the cap member. The opposite extended end 58 of the cover is then rolled forward to the extended position with the rubber band retaining member 60 employed to close the open end. The cover in the closed position shown in FIG. 2 effectively and simply encases and closes the waterfowl caller for storage or the like and can simply be opened to the in use position of FIGS. 1 and 12 by reversing the aforementioned procedure.

Various changes and modifications may be made within this invention as will be apparent to those skilled in the art. Such changes and modifications are within the scope and teaching of this invention as defined in the claims appended hereto.

What is claimed is:

1. In a waterfowl caller having a generally tubular barrel supporting an adjustable reed and a generally tubular mouthpiece interfitting with said barrel in removable relation thereto, the improvement comprising an elastic tubular protective cover of rubber or the like supported in an expanded encircling position upon said waterfowl caller extending from a mouthpiece end of said caller to a barrel end of the caller over an interfitting junction of the mouthpiece and the barrel, said cover being held in tight frictional engagement upon both the mouthpiece and barrel of the caller to resist any tendency of the mouthpiece to be removed from the barrel, said cover having a mouthpiece end provided with a cap member connected by a fold portion to a main body section of the cover, said cap member being expandable to fit over and close an open end of the mountpiece of the caller in protective relation thereto when the caller is not in use and being foldable back against the mouhtpiece when the caller is in use.

2. The waterfowl caller of claim 1 in which said fold portion is effected by a circumferential slit of the cover over the mouthpiece adjacent the mouthpiece end, said slit extending over a major part of the circumference of the cover and leaving an unslit fold portion.

3. The waterfowl caller of claim 2 in which said cap means is retainable in the folded back position by ring means fitting closely over the cap means and mouthpiece end portion.

4. The waterfowl caller of claim 1 in which the cover has an open barrel end extending beyond a free open end of the barrel of the caller and means for closing said barrel end when the cover end extends beyond said barrel end of the caller, said barrel end of the cover being rollable back upon itself over the barrel end of the caller when the caller is in use.

5. In a waterfowl caller having a generally tubular barrel supporting an adjustable reed and a generally tubular mouthpiece interfitting with said barrel in removable relation thereto, the improvement comprising an elastic tubular protective cover of rubber or the like supported in an expanded encircling position upon said waterfowl caller extending from a mouthpiece end of said caller to a barrel end of the caller over an interfitting junction of the mouthpiece and the barrel, said cover being held in tight frictional engagement upon both the mouthpiece and barrel of the caller to resist any tendency of the mouthpiece to be removed from the barrel, the cover having an open barrel end extending beyond a free open end of the barrel of the caller and means for closing said barrel end when the cover end extends beyond said barrel end of the caller, said barrel end of the cover being rollable back upon itself over the barrel end of the caller when the caller is in use.

6. In a waterfowl caller having a generally tubular barrel supporting an adjustable reed and a generally tubular mouthpiece interfitting with said barrel in removable relation thereto, the improvement comprising an elastic tubular protective cover of rubber or the like supported in an expanded encircling position upon said waterfowl caller extending from a mouthpiece end of said caller to a barrel end of the caller over an interfitting junction of the mouthpiece and the barrel, said cover being held in tight frictional engagement upon both the mouthpiece and barrel of the caller to resist any tendecy of the mouthpiece to be removed from the barrel, the cover in an unexpanded condition having an internal circumference less than the smallest circumference of the caller in order to provide a snug fit in the cover fitted position upon the caller, the cover having a mouthpiece end provided with a cap member connected by a fold portion to a main body section of the cover, said cap member being expandable to fit over and close an open end of the mouthpiece of the caller in protective relation thereto when the caller is not in use and being foldable back against the mouthpiece when the caller is in use.

7. The waterfowl caller of claim 6 in which the cover has an open barrel end extending beyond a free open end of the barrel of the caller and means for closing said barrel end when the cover end extends beyond said barrel end of the caller, the barrel end of the cover being rollable back upon itself over the barrel end of the caller when the caller is in use.

8. The waterfowl caller of claim 6 in which said fold portion is effected by a circumferential slit of the cover over the mouthpiece adjacent the mouthpiece end, said slit extending over a major part of the circumference of the cover and leaving an unslit fold portion.

9. In a waterfowl caller having a generally tubular barrel supporing an adjustable reed and a generally tubular mouthpiece interfitting with said barrel in removable relation thereto, the improvement comprising an elastic tubular protective cover of rubber or the like supported in an expanded encircling position upon said waterfowl caller extending from a mouthpiece end of said caller to a barrel end of the caller over an interfitting junction of the mouthpiece and the barrel, said cover being held in tight frictional engagement upon both the mouthpiece and barrel of the caller to resist any tendency of the mouthpiece to be removed from the barrel, the cover in an unexpanded condition having an internal circumference less than the smallest circumference of the caller in order to provide a snug fit in the cover fitted position upon the caller the cover further having a roughened non-reflective light absorbing exterior surface.

* * * * *